(12) United States Patent
Souma

(10) Patent No.: US 9,247,134 B2
(45) Date of Patent: Jan. 26, 2016

(54) WIDE-ANGLE LENS SYSTEM, IMAGE SENSING OPTICAL DEVICE AND DIGITAL APPARATUS

(71) Applicant: Yoshihito Souma, Sakai (JP)

(72) Inventor: Yoshihito Souma, Sakai (JP)

(73) Assignee: KONICA MINOLTA, INC., Tokyo (JP)

( * ) Notice: Subject to any disclaimer, the term of this patent is extended or adjusted under 35 U.S.C. 154(b) by 422 days.

(21) Appl. No.: 13/916,112

(22) Filed: Jun. 12, 2013

(65) Prior Publication Data

US 2014/0055558 A1 Feb. 27, 2014

(30) Foreign Application Priority Data

Jun. 12, 2012 (JP) .................................. 2012-132545

(51) Int. Cl.
| | |
|---|---|
| *G02B 13/04* | (2006.01) |
| *H04N 5/232* | (2006.01) |
| *G02B 9/14* | (2006.01) |
| *G02B 3/04* | (2006.01) |
| *G02B 9/62* | (2006.01) |

(52) U.S. Cl.
CPC .............. *H04N 5/23238* (2013.01); *G02B 3/04* (2013.01); *G02B 9/14* (2013.01); *G02B 9/62* (2013.01); *H04N 5/23245* (2013.01)

(58) Field of Classification Search
CPC ....................................................... G02B 13/04

USPC ................................................... 359/749–753
See application file for complete search history.

(56) References Cited

U.S. PATENT DOCUMENTS

| 2009/0273845 A1* | 11/2009 | Maetaki ................... G02B 1/00 359/676 |
| 2010/0033848 A1 | 2/2010 | Hatada |
| 2012/0033311 A1 | 2/2012 | Uemura |
| 2012/0194924 A1* | 8/2012 | Sakai ..................... G02B 13/04 359/738 |

FOREIGN PATENT DOCUMENTS

| JP | 04-218012 | 8/1992 |
| JP | 2010-039340 | 2/2010 |
| JP | 2012-037640 | 2/2012 |

* cited by examiner

*Primary Examiner* — Scott J Sugarman
(74) *Attorney, Agent, or Firm* — Cozen O'Connor

(57) ABSTRACT

A wide-angle lens system is formed, sequentially from an object side, with a first group having a positive power, a second group having a negative power and a third group having a positive power, and at the time of focusing, only the second group is moved on an optical axis. The lens system satisfies conditional formulas of $0.3 < BH1/T1 < 0.7$ and $0.9 < f3/f < 1.8$ (where BH1 is a distance from the final surface of the first group to a principal point position on the back side of the first group, T1 is a distance on the optical axis from a lens element surface of the first group closest to the side of the object to a lens element surface closest to the side of the image, f3 is the focal length of the third group and f is the focal length of the entire system).

20 Claims, 11 Drawing Sheets

EX1

FIG.6A (EX1)
FNO=2.03
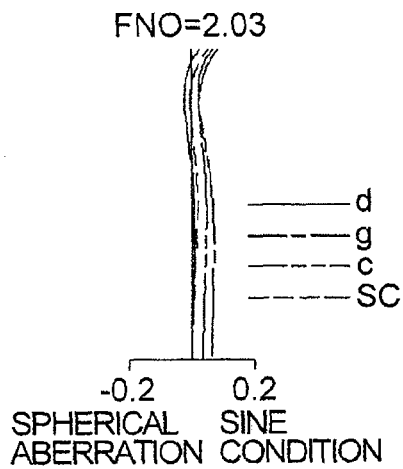
SPHERICAL ABERRATION   SINE CONDITION
FIG.6B (EX1)
Y'=14.2
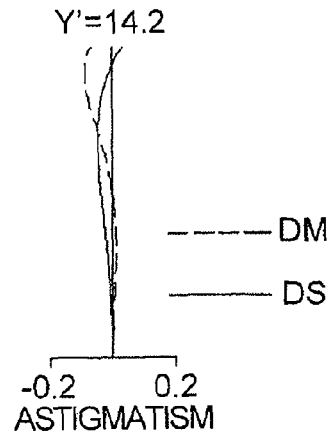
ASTIGMATISM
FIG.6C (EX1)
Y'=14.2
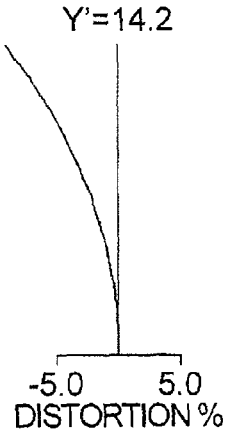
DISTORTION %
FIG.6D (EX1)
EFFECTIVE FNO=2.08
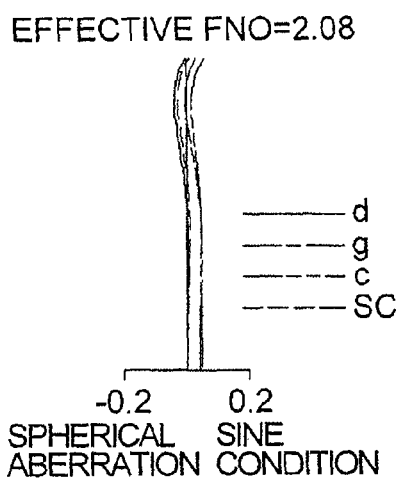
SPHERICAL ABERRATION   SINE CONDITION
FIG.6E (EX1)
Y'=14.2
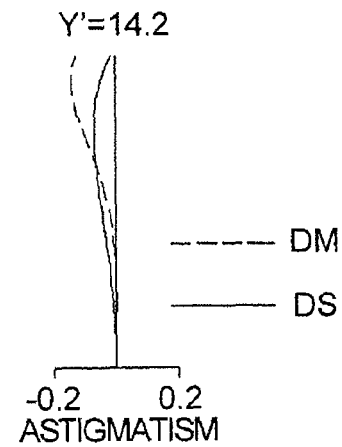
ASTIGMATISM
FIG.6F (EX1)
Y'=14.2
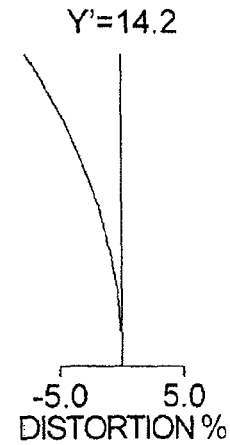
DISTORTION %
FIG.6G (EX1)
EFFECTIVE FNO=2.21
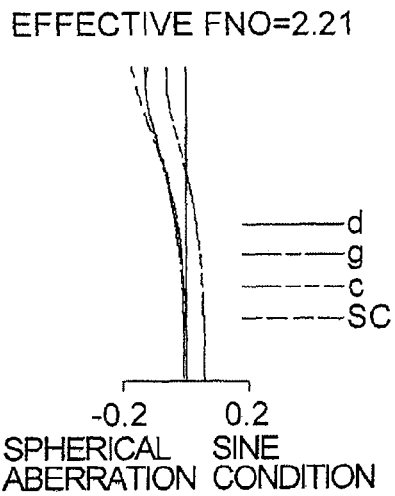
SPHERICAL ABERRATION   SINE CONDITION
FIG.6H (EX1)
Y'=14.2
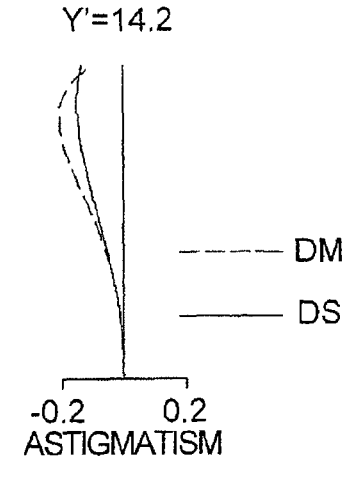
ASTIGMATISM
FIG.6I (EX1)
Y'=14.2
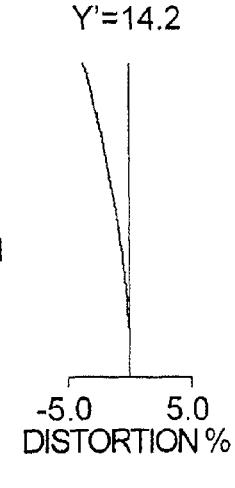
DISTORTION %

FIG.7A (EX2)
FNO=2.03
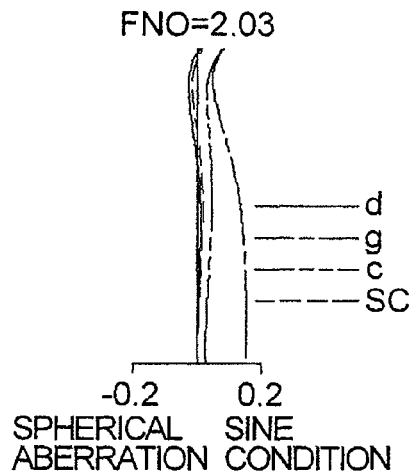
SPHERICAL ABERRATION / SINE CONDITION
FIG.7B (EX2)
Y'=14.2
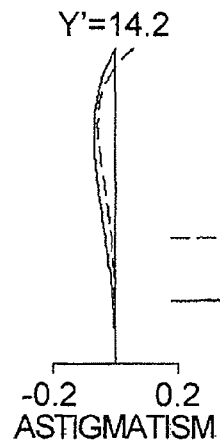
ASTIGMATISM
FIG.7C (EX2)
Y'=14.2
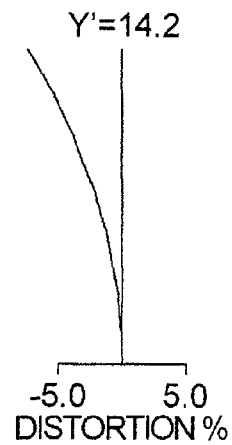
DISTORTION %
FIG.7D (EX2)
EFFECTIVE FNO=2.09
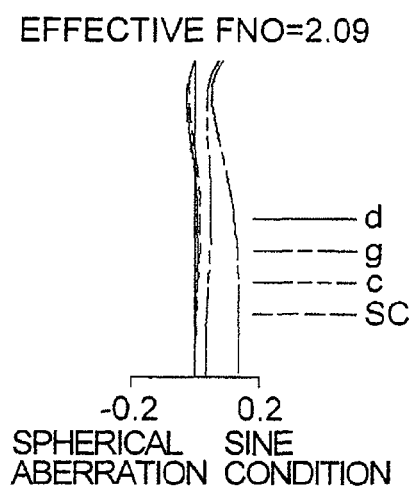
SPHERICAL ABERRATION / SINE CONDITION
FIG.7E (EX2)
Y'=14.2
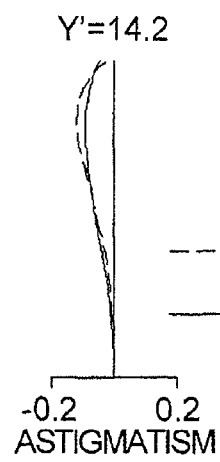
ASTIGMATISM
FIG.7F (EX2)
Y'=14.2
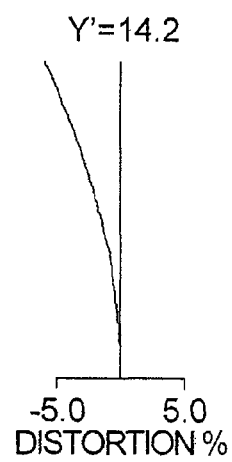
DISTORTION %
FIG.7G (EX2)
EFFECTIVE FNO=2.25
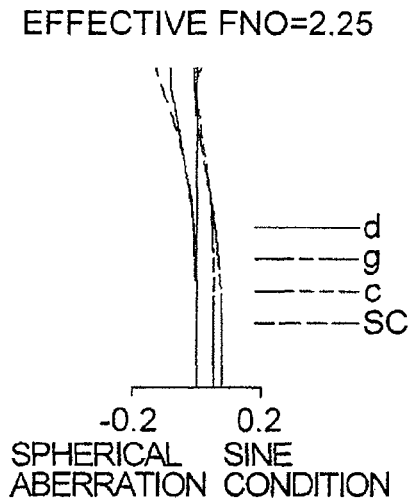
SPHERICAL ABERRATION / SINE CONDITION
FIG.7H (EX2)
Y'=14.2
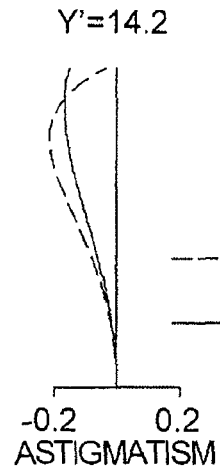
ASTIGMATISM
FIG.7I (EX2)
Y'=14.2
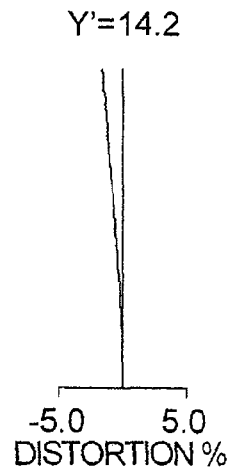
DISTORTION %

FIG.8A (EX3)
FNO=2.03
FIG.8B (EX3)
Y'=14.2
FIG.8C (EX3)
Y'=14.2
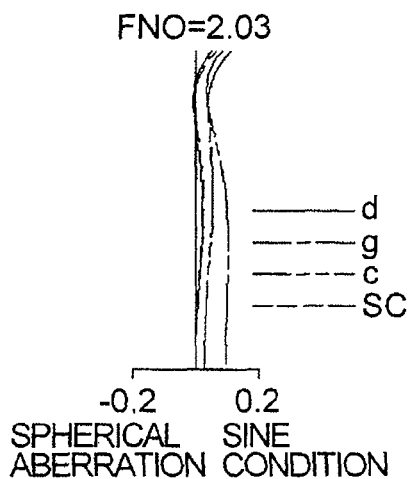
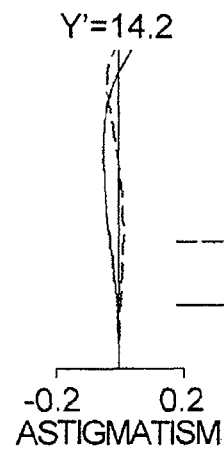
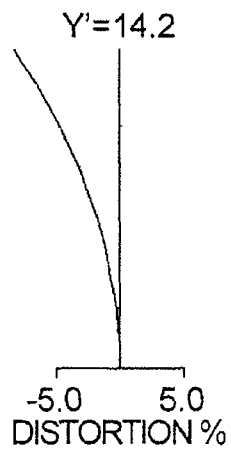
-0.2  0.2
SPHERICAL  SINE
ABERRATION  CONDITION
-0.2  0.2
ASTIGMATISM
-5.0  5.0
DISTORTION %
FIG.8D (EX3)
EFFECTIVE FNO=2.09
FIG.8E (EX3)
Y'=14.2
FIG.8F (EX3)
Y'=14.2
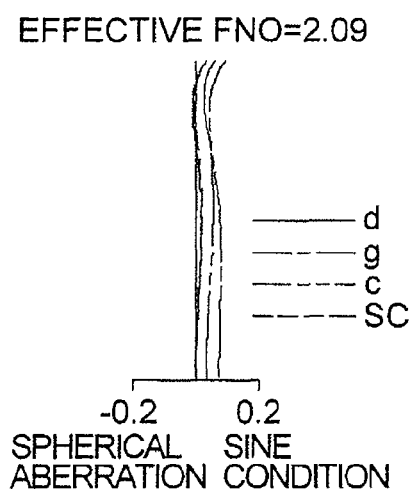
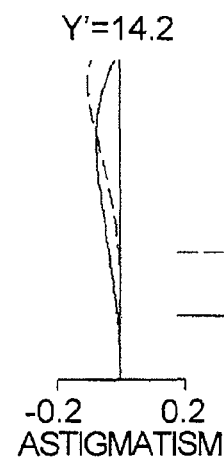
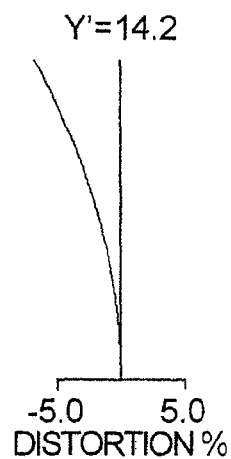
-0.2  0.2
SPHERICAL  SINE
ABERRATION  CONDITION
-0.2  0.2
ASTIGMATISM
-5.0  5.0
DISTORTION %
FIG.8G (EX3)
EFFECTIVE FNO=2.26
FIG.8H (EX3)
Y'=14.2
FIG.8I (EX3)
Y'=14.2
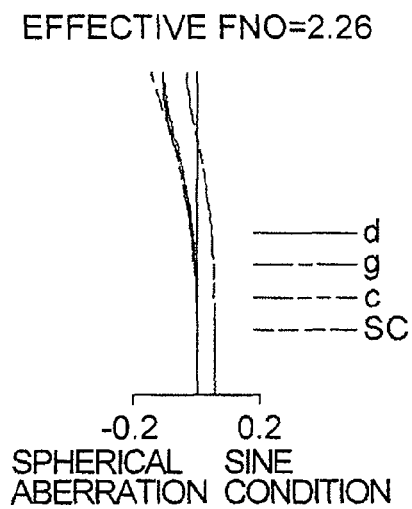
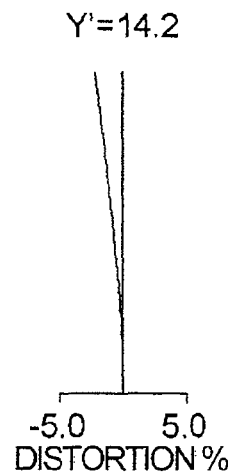
-0.2  0.2
SPHERICAL  SINE
ABERRATION  CONDITION
-0.2  0.2
ASTIGMATISM
-5.0  5.0
DISTORTION %

FIG.9A (EX4)
FNO=2.03
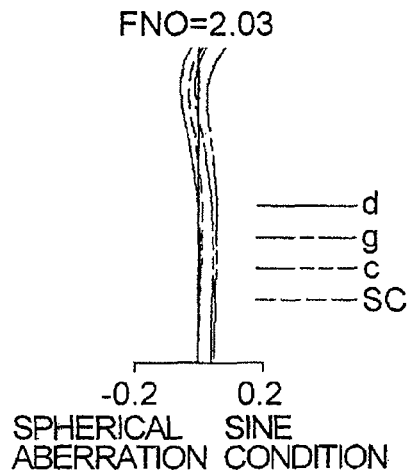
-0.2  0.2
SPHERICAL   SINE
ABERRATION  CONDITION
FIG.9B (EX4)
Y'=14.2
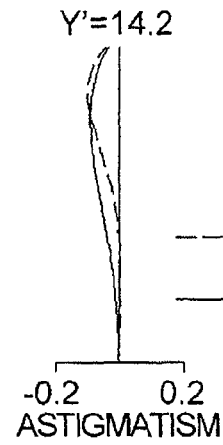
-0.2  0.2
ASTIGMATISM
FIG.9C (EX4)
Y'=14.2
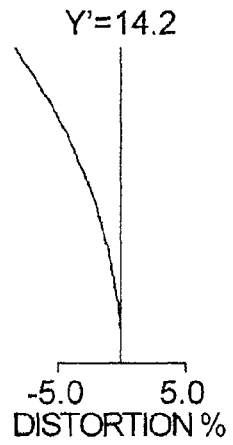
-5.0  5.0
DISTORTION %
FIG.9D (EX4)
EFFECTIVE FNO=2.07
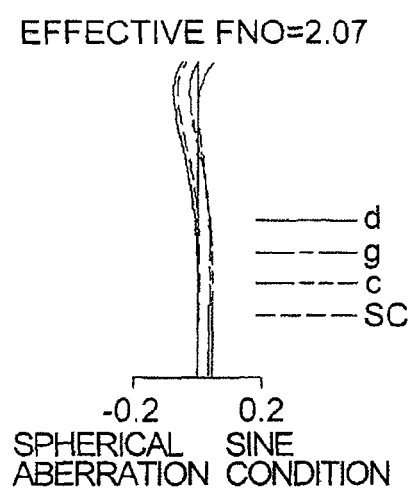
-0.2  0.2
SPHERICAL   SINE
ABERRATION  CONDITION
FIG.9E (EX4)
Y'=14.2
-0.2  0.2
ASTIGMATISM
FIG.9F (EX4)
Y'=14.2
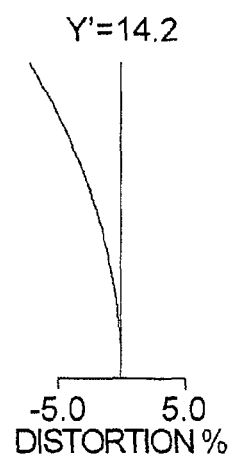
-5.0  5.0
DISTORTION %
FIG.9G (EX4)
EFFECTIVE FNO=2.17
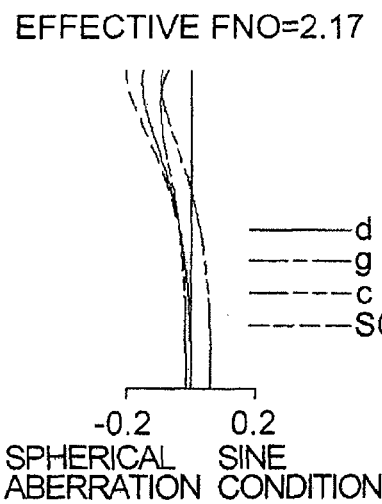
-0.2  0.2
SPHERICAL   SINE
ABERRATION  CONDITION
FIG.9H (EX4)
Y'=14.2
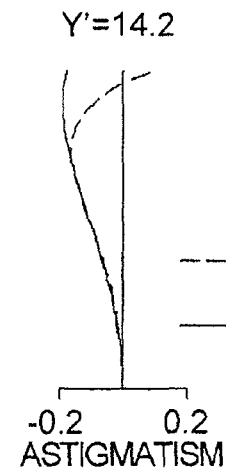
-0.2  0.2
ASTIGMATISM
FIG.9I (EX4)
Y'=14.2
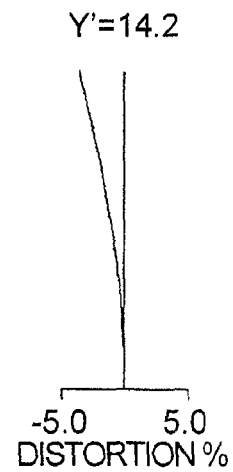
-5.0  5.0
DISTORTION %

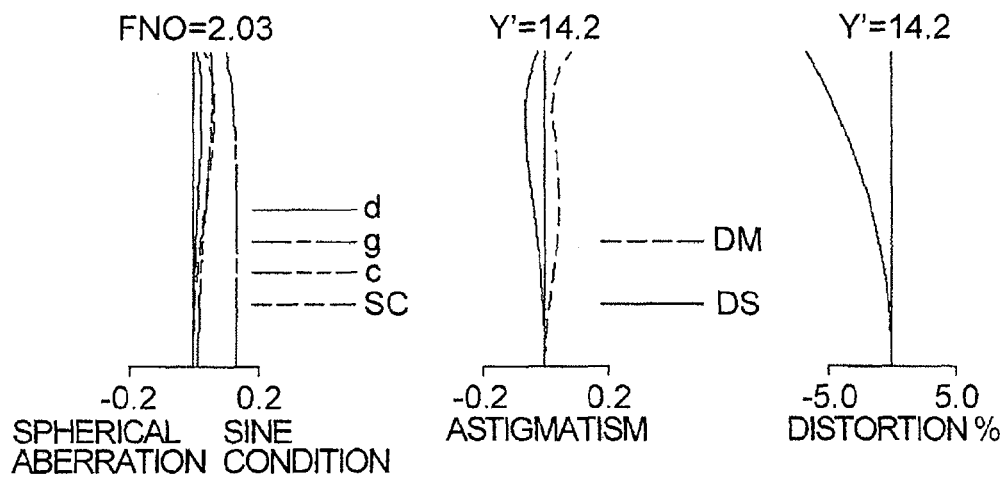
FIG.10A (EX5) FIG.10B (EX5) FIG.10C (EX5)
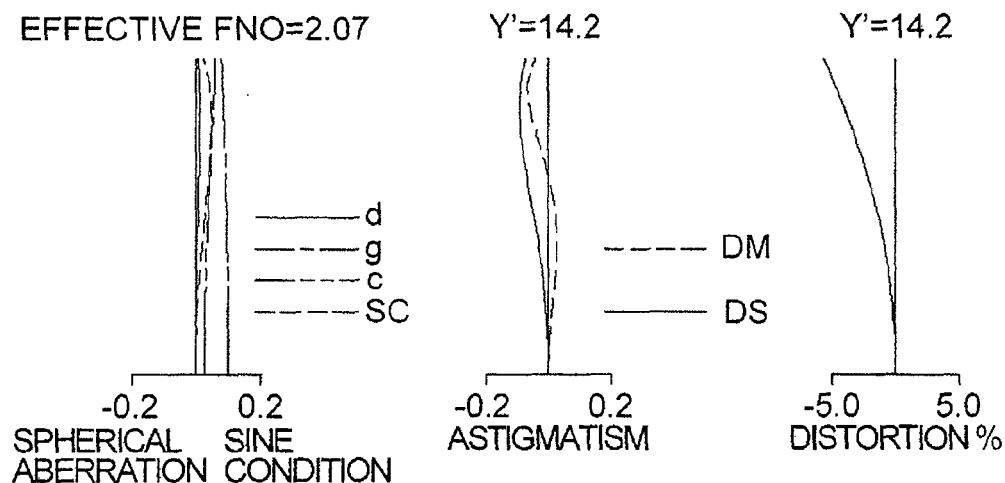
FIG.10D (EX5) FIG.10E (EX5) FIG.10F (EX5)
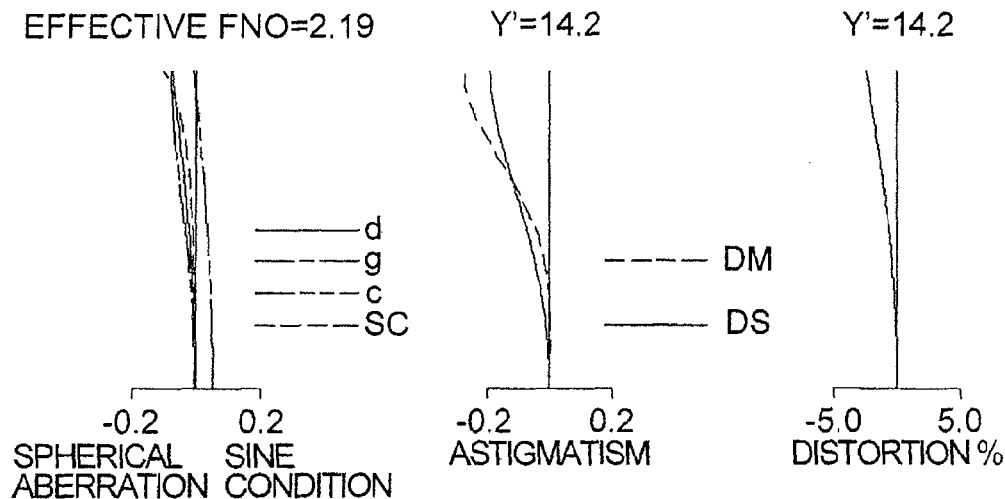
FIG.10G (EX5) FIG.10H (EX5) FIG.10I (EX5)

WIDE-ANGLE LENS SYSTEM, IMAGE SENSING OPTICAL DEVICE AND DIGITAL APPARATUS

This application is based on Japanese Patent Application No. 2012-132545 filed on Jun. 12, 2012, the contents of which are hereby incorporated by reference.

BACKGROUND OF THE INVENTION

1. Field of the Invention

The present invention relates to a wide-angle lens system, an image sensing optical device and a digital apparatus. For example, the present invention relates to: a wide-angle lens system that is suitable for a lens-interchangeable digital camera which takes in the picture of a subject with an image sensing element, that is compact and that has a large aperture; an image sensing optical device that outputs, as an electrical signal, the picture of the subject taken in with the wide-angle lens system and the image sensing element; and a digital apparatus having an image input function, such as a digital camera that incorporates such an image sensing optical device.

2. Description of Related Art

In a conventional large-aperture wide-angle lens system used as an interchangeable lens for a single-lens reflex camera, for example, an overall feed-out system as disclosed in patent document 1 and a rear focus system as disclosed in patent document 2 are mainly used as a focusing system. In recent years, users have accepted the compactness of mirror-less lens-interchangeable cameras formed by omitting a flip-up mirror from a single-lens reflex camera, and thus their market has extended. In some of the mirror-less lens-interchangeable cameras, phase-difference AF (autofocus) that is mainly used in a conventional single-lens reflex camera cannot be used. In such cameras, so-called contrast AF is used in which focusing is performed by scanning a focusing lens group to find a place where the contrast is the highest.

Patent document 1: JP-A-2012-037640
Patent document 2: JP-A-2010-039340

A problem occurring when the contrast AF is used is the weight of the focusing lens group. Since in the phase-difference AF, it is possible to calculate, with information from an AF sensor, the amount of movement of the focusing lens group necessary to achieve focusing, it is possible to move the focusing lens group according to the amount. On the other hand, since in the contrast AF, information obtained from an AF sensor is only an instantaneous contrast value, a focusing operation is performed by finding a place where the contrast is the highest while the focusing lens group is being moved and instantaneous variations in contrast are being read. Hence, when the amount of movement of the focusing lens group until the focusing is achieved is compared between the contrast AF and the phase-difference AF, the amount is significantly larger in the former case. It is obvious from what has been described above that, in an optical system corresponding to the contrast AF, the reduction in the weight of the focusing lens group is an important point. In this point, the focusing lens groups disclosed in patent documents 1 and 2 insufficiently reduce the weight thereof, and thus it is required to produce a new optical solution.

SUMMARY OF THE INVENTION

The present invention is made in view of the foregoing conditions; an object of the present invention is to provide a small and high-performance wide-angle lens system which has a large aperture and in which the weight of a focusing lens group is reduced, and an image sensing optical device and a digital apparatus including such a wide-angle lens system.

According to the present invention, there is provided a wide-angle lens system which is formed, sequentially from a side of an object, with a first group having a positive optical power, a second group having a negative optical power and a third group having a positive optical power and in which at a time of focusing, only the second group is moved on an optical axis, in which the wide-angle lens system satisfies conditional formulas (1) and (2) below:

$$0.3 < BH1/T1 < 0.7 \tag{1}$$

$$0.9 < f3/f < 1.8 \tag{2}$$

where BH1 is a distance from a final surface of the first group to a principal point position on a back side of the first group (a direction extending from the side of the object to an image surface is positive), T1 is a distance on the optical axis from a lens element surface of the first group closest to the side of the object to a lens element surface closest to the side of the image, f3 is a focal length of the third group and f is a focal length of the entire system.

According to the present invention, there is provided an image sensing optical device including: the wide-angle lens system described above; and an image sensing element that converts an optical image formed on a light receiving surface into an electrical signal, in which the wide-angle lens system is provided such that the optical image of a subject is formed on the light receiving surface of the image sensing element.

According to the present invention, there is provided a digital apparatus, in which the digital apparatus includes the image sensing optical device described above such that at least one function of still image shooting and moving image shooting of the subject is added.

BRIEF DESCRIPTION OF THE DRAWINGS

FIGS. 6A to 6I are diagrams of aberrations of the first example;

FIGS. 7A to 7I are diagrams of aberrations of the second example;

FIGS. 8A to 8I are diagrams of aberrations of the third example;

FIGS. 9A to 9I are diagrams of aberrations of the fourth example;

FIGS. 10A to 10I are diagrams of aberrations of the fifth example; and

DETAILED DESCRIPTION OF PREFERRED EMBODIMENTS

Figure 1:
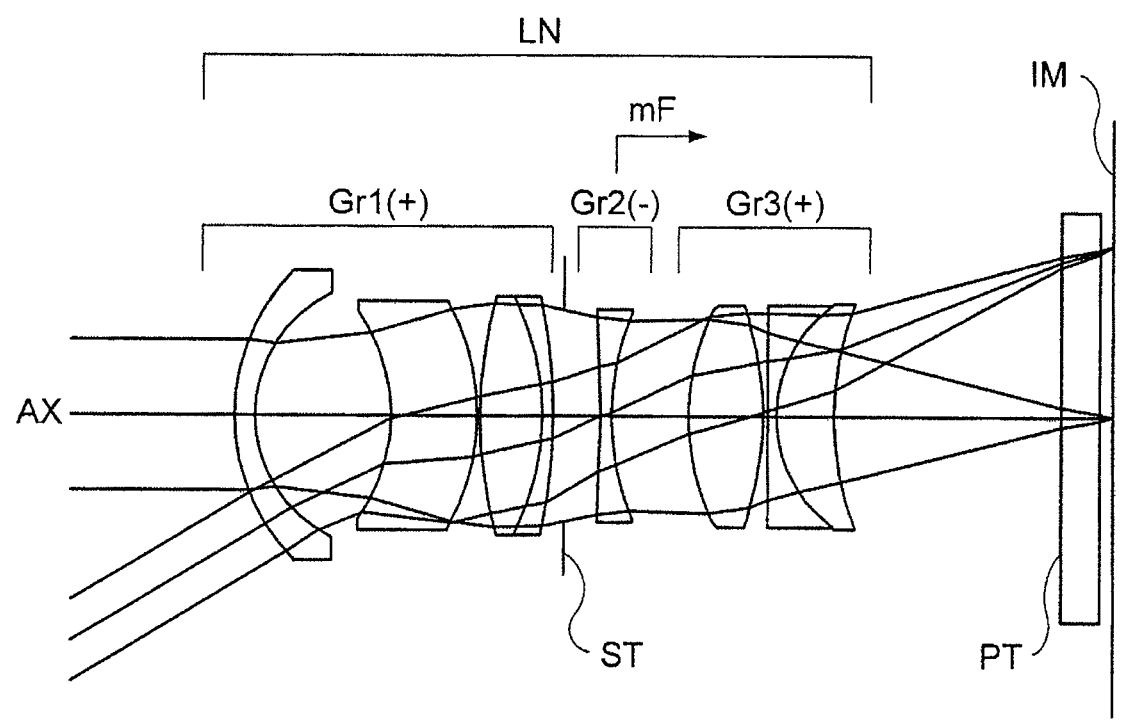
FIG. 1 is an optical configuration diagram of a first embodiment (first example)
Figure 2:
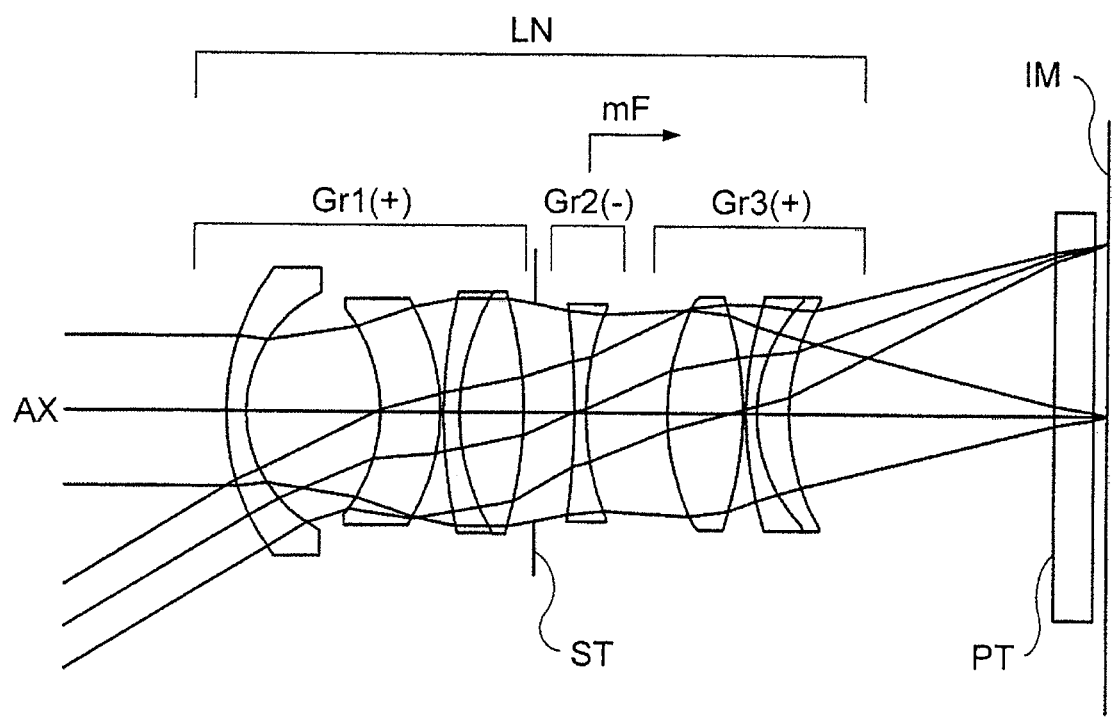
FIG. 2 is an optical configuration diagram of a second embodiment (second example)
Figure 3:
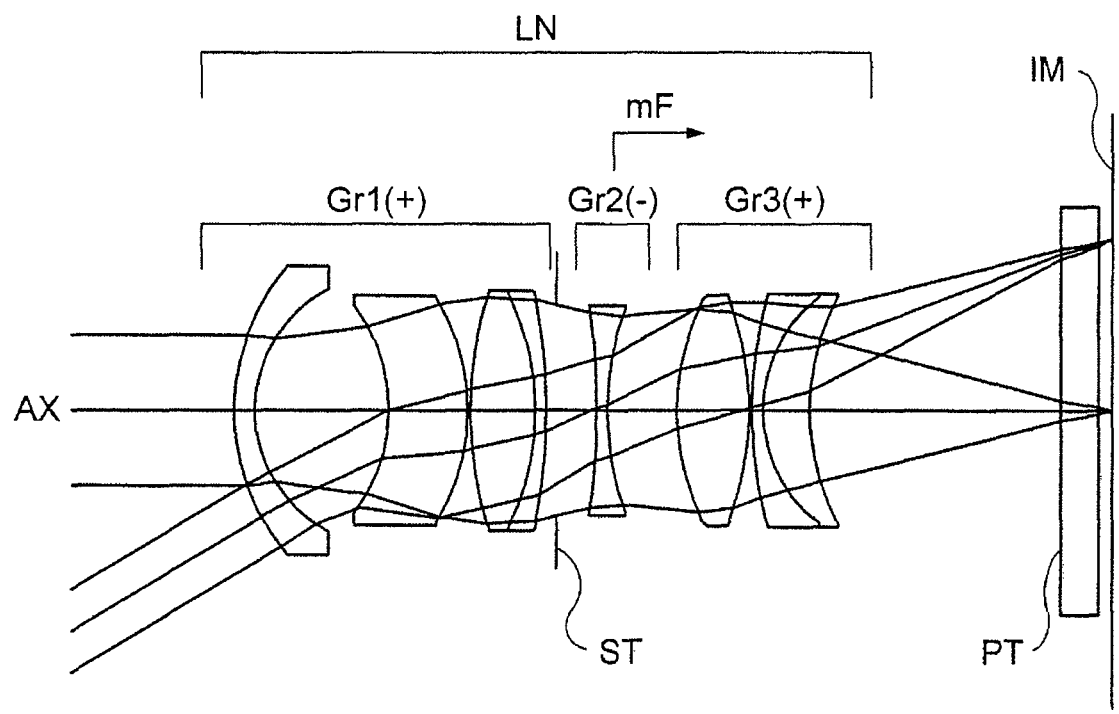
FIG. 3 is an optical configuration diagram of a third embodiment (third example)
Figure 4:
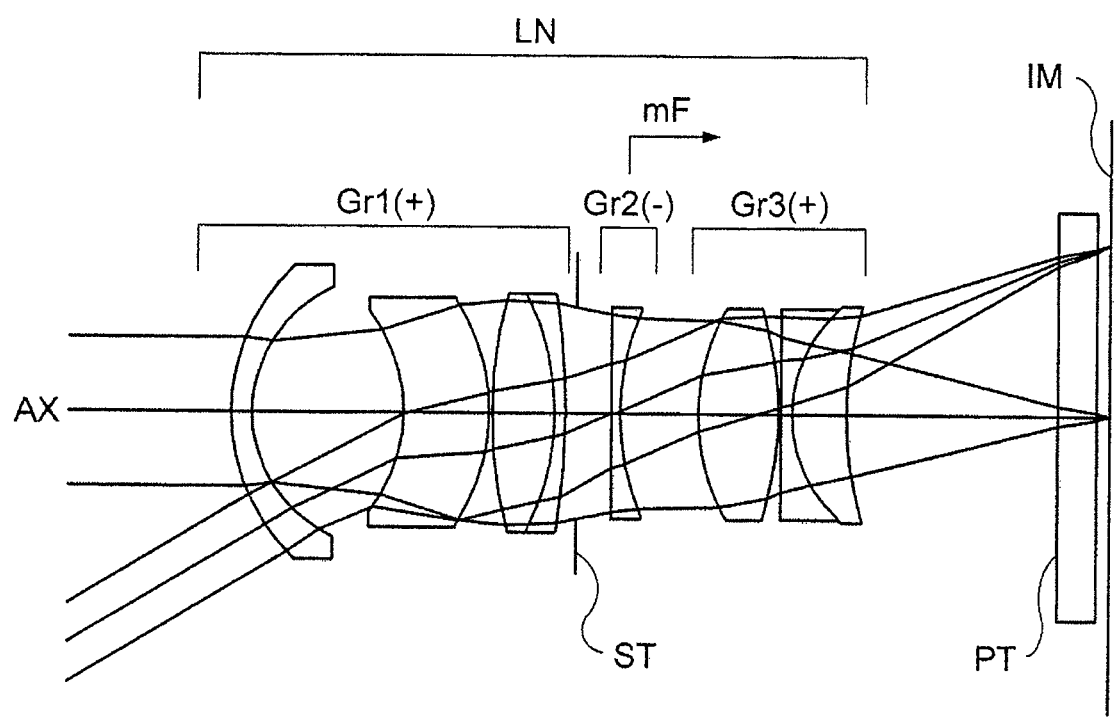
FIG. 4 is an optical configuration diagram of a fourth embodiment (fourth example)
Figure 5:
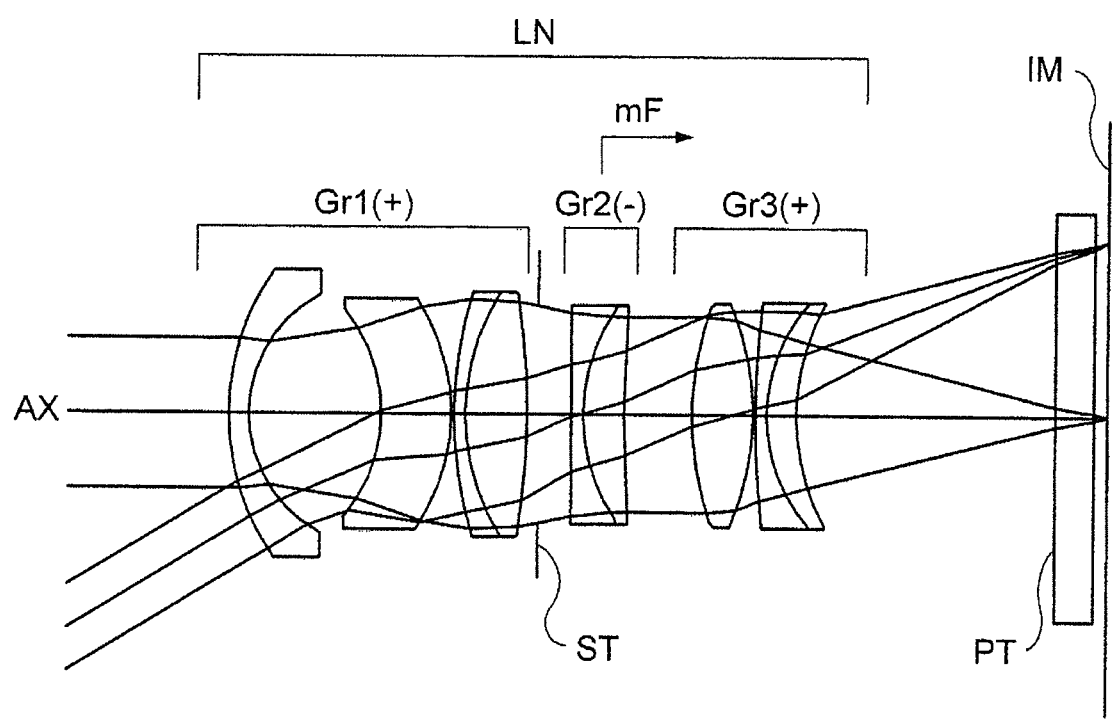
FIG. 5 is an optical configuration diagram of a fifth embodiment (fifth example)

A wide-angle lens system, an image sensing optical device and a digital apparatus according to the present invention will be described below. The wide-angle lens system of the present invention is formed, sequentially from the side of an object, with a first group having a positive optical power, a second group having a negative optical power and a third group having a positive optical power (optical power: an amount defined by the reciprocal of a focal length); at the time of focusing, only the second group is moved on an optical axis. In other words, the first and third groups of positive power are fixed at the time of focusing, and the second group of negative power is moved along the optical axis at the time of focusing.

Then, the wide-angle lens system satisfies conditional formulas (1) and (2) below:

$$0.3 < BH1/T1 < 0.7 \quad (1)$$

$$0.9 < f3/f < 1.8 \quad (2)$$

where BH1 is a distance from the final surface of the first group to a principal point position on the back side of the first group (a direction extending from the side of the object to an image surface is assumed to be positive),
T1 is a distance on the optical axis from a lens element surface of the first group closest to the side of the object to a lens element surface closest to the side of the image,
f3 is the focal length of the third group and
f is the focal length of the entire system.

In a large-aperture lens system, in order to satisfactorily correct a spherical aberration or a coma aberration, it is important to put a largest amount of correction flexibility in a place where an on-axis light ray height is high. In the present optical system, since the on-axis light ray height of a light beam entering the third group is kept in a position as high as possible, it is possible to utilize the flexibility of all the lens element surfaces of the first to third groups for the correction of a spherical aberration and a coma aberration without any flexibility left.

Here, when the value falls below the lower limit of conditional formula (1), since an imaging plane produced by the first group is excessively brought close to the second group, it is necessary to increase the negative optical power of the second group if the on-axis light ray height of the light beam entering the third group attempts to be maintained. Consequently, it is difficult to reduce variations in aberration caused by the movement of the second group at the time of focusing. By contrast, when the value exceeds the upper limit of conditional formula (1), since the on-axis light ray height of a light beam entering the second group is excessively increased, it is necessary to increase the diameter of the second group. Consequently, the weight of a focusing lens group is undesirably increased.

Conditional formula (2) defines a desirable conditional range of the positive optical power of the third group. When the value exceeds the upper limit of conditional formula (2), the optical power of the third group becomes insufficient, and thus the size of the optical system is undesirably increased. By contrast, when the value falls below the lower limit of conditional formula (2), the optical power of the third group is excessively increased, and the size of the optical system is decreased but it is undesirably difficult to correct a spherical aberration and a coma aberration caused within the third group.

In the characteristic configuration described above, since the conditions for reducing the weight of the focusing lens group are appropriately set, though a large aperture is provided and the weight of the focusing lens group is reduced, it is possible to realize a wide-angle lens system and an image sensing optical device having a small size and a high performance. The wide-angle lens system or the image sensing optical device having a large aperture, a low weight and a small size is used in a digital apparatus such as a digital camera, and thus it is possible to add, to the digital apparatus, a high-performance image input function while the digital apparatus has a low weight and compactness, with the result that it is possible to facilitate the compactness, the low cost, the high performance, the high functionality and the like of the digital apparatus. For example, the weight of the focusing lens group is reduced, and thus it is possible to achieve high-accurate contrast AF. Moreover, since the wide-angle lens system of the present invention is suitable as an interchangeable lens for a mirror-less lens interchangeable digital camera, it is possible to realize an interchangeable lens that is convenient to carry about and that has a low weight and a small size. Conditions and the like for obtaining the effects described above in a balanced manner and achieving a higher optical performance, a smaller size and the like will be described below.

More preferably, the wide-angle lens system of the present invention satisfies conditional formula (1a) below:

$$0.4 < BH1/T1 < 0.6 \quad (1a)$$

The conditional formula (1a) defines a further desirable conditional range based on the viewpoint described above and the like within the conditional range defined in conditional formula (1) described above. Hence, it is desirable to satisfy conditional formula (1a) because the actions described above are more reliably achieved and the effects described above can be further enhanced.

More preferably, the wide-angle lens system of the present invention satisfies conditional formula (2a) below:

$$1.0 < f3/f < 1.5 \quad (2a)$$

The conditional formula (2a) defines a further desirable conditional range based on the viewpoint described above and the like within the conditional range defined in conditional formula (2) described above. Hence, it is desirable to satisfy conditional formula (2a) because the actions described above are more reliably achieved and the effects described above can be further enhanced.

The wide-angle lens system of the present invention satisfies conditional formula (3) below:

$$-2.4 < f2/f < -0.5 \quad (3)$$

where f2 is the focal length of the second group and
f is the focal length of the entire system.

The conditional formula (3) defines a desirable conditional range of the negative optical power of the second group. When the value falls below the lower limit of conditional formula (3), the negative optical power of the second group is excessively decreased, and thus the amount of movement at the time of focusing is undesirably increased. By contrast, when the value exceeds the upper limit of conditional formula (3), the negative optical power of the second group is excessively increased, and thus it is difficult to reduce variations in a spherical aberration and a coma aberration caused by focusing.

More preferably, the wide-angle lens system of the present invention satisfies conditional formula (3a) below:

$$-2.0 < f2/f < -0.9 \quad (3a)$$

The conditional formula (3a) defines a further desirable conditional range based on the viewpoint described above and the like within the conditional range defined in conditional formula (3) described above. Hence, it is desirable to satisfy conditional formula (3a) because the actions described above are more reliably achieved and the effects described above can be further enhanced.

The wide-angle lens system of the present invention satisfies conditional formula (4) below:

$$0.7 < f1/f < 1.6 \qquad (4)$$

where f1 is the focal length of the first group and
f is the focal length of the entire system.

The conditional formula (4) defines a desirable conditional range of the positive optical power of the first group. When the value falls below the lower limit of conditional formula (4), the optical power of the first group is excessively increased, and thus it is difficult to correct a spherical aberration and a coma aberration caused within the first group. By contrast, when the value exceeds the upper limit of conditional formula (4), the optical power of the first group is excessively decreased, and the size of the optical system is undesirably increased. In order to prevent the size of the optical system from being increased, it is necessary to increase the optical power of the third group, and it is difficult to correct a spherical aberration and a coma aberration caused within the third group.

More preferably, the wide-angle lens system of the present invention satisfies conditional formula (4a) below:

$$0.9 < f1/f < 1.4 \qquad (4a)$$

The conditional formula (4a) defines a further desirable conditional range based on the viewpoint described above and the like within the conditional range defined in conditional formula (4) described above. Hence, it is desirable to satisfy conditional formula (4a) because the actions described above are more reliably achieved and the effects described above can be further enhanced.

The wide-angle lens system of the present invention satisfies conditional formula (5) below:

$$-1.0 < BH3/T3 < -0.5 \qquad (5)$$

where BH3 is a distance from the final surface of the third group to a principal point position on the back side of the third group (a direction extending from the side of the object to the image surface is assumed to be positive), and
T3 is a distance on the optical axis from a lens element surface of the third group closest to the side of the object to a lens element surface closest to the side of the image.

When the value falls below the lower limit of conditional formula (5), the principal point position on the back side of the third group is excessively close to the side of the object, the angle at which an off-axis light beam enters a sensor is undesirably increased. By contrast, when the value exceeds the upper limit of formula (5), the height of an off-axis light ray passing through the third group is excessively increased, and thus it is difficult to correct astigmatism and distortion.

More preferably, the wide-angle lens system of the present invention satisfies conditional formula (5a) below:

$$-0.9 < BH3/T3 < -0.6 \qquad (5a)$$

The conditional formula (5a) defines a further desirable conditional range based on the viewpoint described above and the like within the conditional range defined in conditional formula (5) described above. Hence, it is desirable to satisfy conditional formula (5a) because the actions described above are more reliably achieved and the effects described above can be further enhanced.

Preferably, the wide-angle lens system of the present invention satisfies conditional formula (6) below:

$$2 < |\beta 2| \qquad (6)$$

where β2 is the paraxial lateral magnification of the second group at the time of focusing at infinity.

In order to reduce variations in aberration caused by focusing, it is effective to bring a light beam emitted from the second group moved by focusing close to an a focal state, and to reduce variations in the height of an on-axis light ray entering the third group. When the value falls below the lower limit of conditional formula (6), the light beam emitted from the second group is excessively converged or diverged, and thus it is impossible to desire the actions described above.

More preferably, the wide-angle lens system of the present invention satisfies conditional formula (6a) below:

$$3 < |\beta 2| \qquad (6a)$$

The conditional formula (6a) defines a further desirable conditional range based on the viewpoint described above and the like within the conditional range defined in conditional formula (6) described above. Hence, it is desirable to satisfy conditional formula (6a) because the actions described above are more reliably achieved and the effects described above can be further enhanced.

Preferably, the wide-angle lens system of the present invention satisfies conditional formula (7) below:

$$(1-\beta 2^2)\beta 3^2 < -0.5 \qquad (7)$$

where β2 is the paraxial lateral magnification of the second group at the time of focusing at infinity, and
β3 is the paraxial lateral magnification of the third group at the time of focusing at infinity.

When the value exceeds the upper limit of conditional formula (7), the sensitivity of focusing of the second group is excessively decreased, and the amount of movement of the second group at the time of focusing is undesirably increased.

More preferably, the wide-angle lens system of the present invention satisfies conditional formula (7a) below:

$$(1-\beta 2^2)\beta 3^2 < -0.6 \qquad (7a)$$

The conditional formula (7a) defines a further desirable conditional range based on the viewpoint described above and the like within the conditional range defined in conditional formula (7) described above. Hence, it is desirable to satisfy conditional formula (7a) because the actions described above are more reliably achieved and the effects described above can be further enhanced.

Preferably, in the wide-angle lens system of the present invention, an aperture stop is arranged in an air spacing between the first group and the second group. The focusing lens group is arranged adjacent to the aperture stop, and thus it is possible to reduce variations in the chromatic aberration of magnification caused by the movement of the focusing lens group.

Preferably, in the wide-angle lens system of the present invention, the second group is formed with one negative lens element, and the wide-angle lens system satisfies conditional formula (8) below:

$$0.2 < (r1+r2)/(r1-r2) < 1.5 \qquad (8)$$

where r1 is the radius of curvature of the surface of the negative lens element on the side of the object, and
r2 is the radius of curvature of the surface of the negative lens element on the side of the image.

The second group is formed with one negative lens element, and thus it is possible to reduce the weight of the focusing lens group. In this case, the aperture stop is arranged on the side of the object of the second group and conditional formula (8) is satisfied, and thus it is possible to produce a positive astigmatism in the negative lens element and balance a negative astigmatism in the entire optical system.

More preferably, the wide-angle lens system of the present invention satisfies conditional formula (8a) below:

$$0.4 < (r1+r2)/(r1-r2) < 1.3 \tag{8a}$$

The conditional formula (8a) defines a further desirable conditional range based on the viewpoint described above and the like within the conditional range defined in conditional formula (8) described above. Hence, it is desirable to satisfy conditional formula (8a) because the actions described above are more reliably achieved and the effects described above can be further enhanced.

Preferably, in the wide-angle lens system of the present invention, the second group is formed with one cemented lens element composed of a negative lens element and a positive lens element, and the wide-angle lens system satisfies conditional formula (9) below:

$$vp-vn > 20 \tag{9}$$

where vp is the Abbe number of the positive lens element of the cemented lens element, and
vn is the Abbe number of the negative lens element of the cemented lens element.

The second group is formed with one negative cemented lens element, and thus it is possible to reduce the weight of the focusing lens group. In this case, conditional formula (9) is satisfied, and thus it is possible to reduce a chromatic aberration caused by the second group and variations in chromatic aberration caused by focusing.

More preferably, the wide-angle lens system of the present invention satisfies conditional formula (9a) below:

$$vp-vn > 30 \tag{9a}$$

The conditional formula (9a) defines a further desirable conditional range based on the viewpoint described above and the like within the conditional range defined in conditional formula (9) described above. Hence, it is desirable to satisfy conditional formula (9a) because the actions described above are more reliably achieved and the effects described above can be further enhanced.

Preferably, in the third group of the wide-angle lens system of the present invention, a biconvex positive lens element is provided that has an aspherical surface whose positive optical power is reduced as it extends to its periphery portion. The aperture stop is arranged between the first group and the second group, and thus the height of an off-axis light ray in the third group is increased to some degree; it is effective for correction of astigmatism and a coma aberration to arrange the aspherical surface in here. In this case, the aspherical surface whose positive optical power is reduced as it extends to its periphery is arranged in the biconvex positive lens element having a high optical power, and thus it is possible to sufficiently obtain, in addition to the effects described above, an optical power necessary in the entire third group while reducing the production of a spherical aberration.

The wide-angle lens system of the present invention is suitably used as an image sensing lens element for a digital apparatus (for example, a digital camera) having an image input function; it is combined with an image sensing element or the like, and thus it is possible to form an image sensing optical device that optically takes in the picture of a subject and outputs it as an electrical signal. The image sensing optical device is an optical device that forms a main constituent element of a camera used for shooting a still image or a moving image of the subject; for example, the image sensing optical device is configured by including, sequentially from the side of the object (that is, the subject), a wide-angle lens system that forms an optical image of the object and an image sensing element that converts the optical image formed by the wide-angle lens system into an electrical signal. Then, the wide-angle lens system having the characteristic configuration described above is arranged such that the optical image of the subject is formed on the light receiving surface (that is, the image sensing surface) of the image sensing element, and thus it is possible to realize an image sensing optical device having a small size and a high performance at a low cost and a digital apparatus including such an image sensing optical device.

Examples of the digital apparatus having the image input function include cameras such as a digital camera, a video camera, a monitoring camera, a vehicle-mounted camera and a TV telephone camera. The examples also include a camera function incorporated or externally provided in a personal computer, a portable digital apparatus (for example, a cell phone, a smart phone and a mobile computer), their peripheral devices (such as a scanner and a printer) and other digital apparatuses. It is obvious from the above examples that it is possible not only to configure a camera with the image sensing optical device but also to add a camera function to various devices by incorporating the image sensing optical device. For example, it is possible to configure a digital apparatus having an image input function such as a camera-incorporating cell phone.

Figure 11:
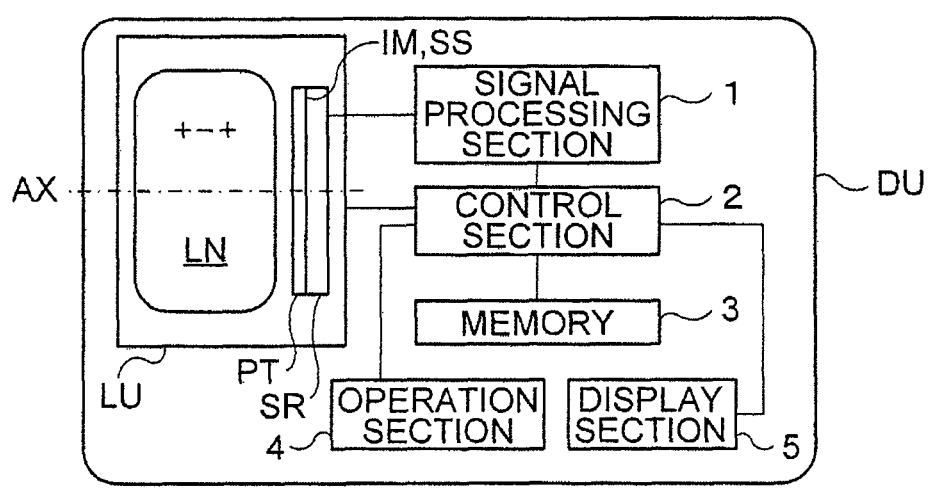
FIG. 11 is a schematic diagram showing an example of the schematic configuration of a digital apparatus incorporating a wide-angle lens system.

In FIG. 11, as an example of a digital apparatus having an image input function, an example of a schematic configuration of a digital apparatus DU is shown in a schematic cross-sectional view. An image sensing optical device LU incorporated in the digital apparatus DU shown in FIG. 11 includes, sequentially from the side of an object (that is, a subject), a wide-angle lens system LN (AX: optical axis) that forms an optical image (image surface) IM of the object, a parallel flat surface plate PT (the cover glass of an image sensing element SR; corresponding to an optical filter or the like such as an optical low-pass filter or an infrared cut filter arranged as necessary) and the image sensing element SR that converts, with the wide-angle lens system LN, the optical image IM formed on a light receiving surface (image sensing surface) SS into an electrical signal. When the digital apparatus DU having an image input function is formed with the image sensing optical device LU, though the image sensing optical device LU is generally arranged within its body, it is possible to adopt a form corresponding to the necessity for realizing a camera function. For example, the image sensing optical device LU formed as a unit can be removably or rotatably provided in the main body of the digital apparatus DU.

As the image sensing element SR, for example, a solid-state image sensing element is used such as a CCD (charge coupled device) image sensor or a CMOS (complementary metal-oxide semiconductor) image sensor having a plurality of pixels. Since the wide-angle lens system LN is provided such that the optical image IM of the subject is formed on the light receiving surface SS which is the optical conversion portion of the image sensing element SR, the optical image IM formed by the wide-angle lens system LN is converted into an electrical signal by the image sensing element SR.

The digital apparatus DU includes, in addition to the image sensing optical device LU, a signal processing section 1, a control section 2, a memory 3, an operation section 4 and a display section 5. The signal generated in the image sensing element SR is subjected, in the signal processing section 1, to predetermined digital image processing, image compression processing or the like as necessary, is recorded as a digital picture signal in the memory 3 (such as a semiconductor memory or an optical disc) or is converted through a cable into an infrared signal or the like depending on the situation and is transferred to another device (for example, the communication function of a cell phone). The control section 2 is formed with a microcomputer, and intensively controls, for example, shooting functions (such as a still image shooting function and a moving image shooting function), functions such as an image reproduction function and lens movement mechanisms such as for focusing and camera shake correction. For example, in order to perform at least one of the still image shooting and the moving image shooting of the subject, the control section 2 controls the image sensing optical device LU. The display section 5 is a portion that includes a display such as a liquid crystal monitor, and uses an image signal converted by the image sensing element SR or image information recorded in the memory 3 to display an image. The operation section 4 is a portion that includes operation members such as an operation button (for example, a release button) and an operation dial (for example, a shooting mode dial), and transmits information input by an operator to the control section 2.

The wide-angle lens system LN is formed with three groups having positive-negative-positive optical powers; with the positions of the first and third groups fixed to the image surface IM, the second group is moved along the optical axis AX to the side of the image, and thus focusing is performed on a short-distance object to form the optical image IM on the light receiving surface SS of the image sensing element SR.

Here, the specific optical configuration of the wide-angle lens system LN will be described with first to fifth embodiments. FIGS. 1 to 5 are optical configuration diagrams that respectively correspond to the wide-angle lens systems LN of the first to fifth embodiments, and show the optical cross-sectional view in the lens arrangement with the subject at infinity. The wide-angle lens system LN is formed, sequentially from the side of the object, with a first group Gr1 having a positive optical power, a second group Gr2 having a negative optical power and a third group Gr3 having a positive optical power. At the time of focusing, only the second group Gr2 is moved on the optical axis AX. Specifically, the second group Gr2, which is a focusing lens group, is moved, as indicated by an arrow mF, to the side of the image in the focusing of the short-distance object. In the first to fourth embodiments, the second group Gr2 is formed with one negative lens element; in the fifth embodiment, the second group Gr2 is formed with one cemented lens element composed of a negative lens element and a positive lens element. Since the second group Gr2 is formed with only one negative lens element or one cemented lens element, and thus its weight is reduced, it is advantageous in focusing.

The wide-angle lens system LN (FIG. 1) of the first embodiment is formed with three groups of positive-negative-positive, and each group is configured as follows. The first group Gr1 is formed, sequentially from the side of the object, with a negative meniscus lens element concave toward the side of the image, a negative meniscus lens element concave toward the side of the object and a cemented lens element composed of a biconvex positive lens element and a negative meniscus lens element concave toward the side of the object. The second group Gr2 (focusing lens group) is formed with one biconcave negative lens element; between the first group Gr1 and the second group Gr2, an aperture stop ST is arranged. The third group Gr3 is formed, sequentially from the side of the object, with a biconvex positive lens element formed with both aspherical surfaces (aspherical surface whose positive optical power is reduced as it extends to its periphery portion) and a cemented lens element composed of a negative meniscus lens element concave toward the side of the image and a positive meniscus lens element convex toward the side of the object. The parallel flat surface plate PT arranged on the side of the image with respect to the wide-angle lens system LN is a glass flat plate equivalent to the optical thickness of the total of the cover glass of the image sensing element SR and a moire prevention low-pass filter.

The wide-angle lens system LN (FIG. 2) of the second embodiment is formed with three groups of positive-negative-positive, and each group is configured as follows. The first group Gr1 is formed, sequentially from the side of the object, with a negative meniscus lens element concave toward the side of the image, a negative meniscus lens element concave toward the side of the object and a cemented lens element composed of a negative meniscus lens element concave toward the side of the image and a biconvex positive lens element. The second group Gr2 (focusing lens group) is formed with one biconcave negative lens element; between the first group Gr1 and the second group Gr2, the aperture stop ST is arranged. The third group Gr3 is formed, sequentially from the side of the object, with a biconvex positive lens element formed with both aspherical surfaces (aspherical surface whose positive optical power is reduced as it extends to its periphery portion) and a cemented lens element composed of a negative meniscus lens element concave toward the side of the image and a positive meniscus lens element convex toward the side of the object. The parallel flat surface plate PT arranged on the side of the image with respect to the wide-angle lens system LN is a glass flat plate equivalent to the optical thickness of the total of the cover glass of the image sensing element SR and the moire prevention low-pass filter.

The wide-angle lens system LN (FIG. 3) of the third embodiment is formed with three groups of positive-negative-positive, and each group is configured as follows. The first group Gr1 is formed, sequentially from the side of the object, with a negative meniscus lens element concave toward the side of the image, a negative meniscus lens element concave toward the side of the object and a cemented lens element composed of a biconvex positive lens element and a negative meniscus lens element concave toward the side of the object. The second group Gr2 (focusing lens group) is formed with one biconcave negative lens element; between the first group Gr1 and the second group Gr2, the aperture stop ST is arranged. The third group Gr3 is formed, sequentially from the side of the object, with a biconvex positive lens element formed with both aspherical surfaces (aspherical surface whose positive optical power is reduced as it extends to its periphery portion) and a cemented lens element composed of a negative meniscus lens element concave toward the side of the image and a positive meniscus lens element convex toward the side of the object. The parallel flat surface plate PT arranged on the side of the image with respect to the wide-angle lens system LN is a glass flat plate equivalent to the optical thickness of the total of the cover glass of the image sensing element SR and the moire prevention low-pass filter.

The wide-angle lens system LN (FIG. 4) of the fourth embodiment is formed with three groups of positive-negative-positive, and each group is configured as follows. The first group Gr1 is formed, sequentially from the side of the object, with a negative meniscus lens element concave toward the side of the image, a negative meniscus lens element concave toward the side of the object and a cemented lens element composed of a biconvex positive lens element and a negative meniscus lens element concave toward the side of the object. The second group Gr2 (focusing lens group) is formed with one negative meniscus lens element concave toward the side of the image; between the first group Gr1 and the second group Gr2, the aperture stop ST is arranged. The third group Gr3 is formed, sequentially from the side of the object, with a biconvex positive lens element formed with both aspherical surfaces (aspherical surface whose positive optical power is reduced as it extends to its periphery portion) and a cemented lens element composed of a biconcave negative lens element and a positive meniscus lens element convex toward the side of the object. The parallel flat surface plate PT arranged on the side of the image with respect to the wide-angle lens system LN is a glass flat plate equivalent to the optical thickness of the total of the cover glass of the image sensing element SR and the moire prevention low-pass filter.

The wide-angle lens system LN (FIG. 5) of the fifth embodiment is formed with three groups of positive-negative-positive, and each group is configured as follows. The first group Gr1 is formed, sequentially from the side of the object, with a negative meniscus lens element concave toward the side of the image, a negative meniscus lens element concave toward the side of the object and a cemented lens element composed of a negative meniscus lens element concave toward the side of the image and a biconvex positive lens element. The second group Gr2 (focusing lens group) is formed with one cemented lens element composed of a biconcave negative lens element and a positive meniscus lens element convex toward the side of the object; between the first group Gr1 and the second group Gr2, the aperture stop ST is arranged. The third group Gr3 is formed, sequentially from the side of the object, with a biconvex positive lens element formed with both aspherical surfaces (aspherical surface whose positive optical power is reduced as it extends to its periphery portion) and a cemented lens element composed of a negative meniscus lens element concave toward the side of the image and a positive meniscus lens element convex toward the side of the object. The parallel flat surface plate PT arranged on the side of the image with respect to the wide-angle lens system LN is a glass flat plate equivalent to the optical thickness of the total of the cover glass of the image sensing element SR and the moire prevention low-pass filter.

EXAMPLES

The configurations and the like of the wide-angle lens system according to the present invention will be specifically described below with construction data and the like on examples. Examples 1 to 5 (EXs 1 to 5) described here are numerical examples that respectively correspond to the first to fifth embodiments described above; the optical configuration diagrams (FIGS. 1 to 5) of the first to fifth embodiments show the lens configurations, the optical paths and the like of corresponding examples 1 to 5.

In the construction data of each example, as surface data, sequentially from the left-side column, surface number, radius of curvature r (mm), on-axis surface spacing d (mm), refractive index nd on d line (wavelength: 587.56 nm) and Abbe number νp on d line are shown. The surface of surface number with an asterisk * is an aspherical surface; its surface shape is defined by formula (AS) below using a local orthogonal coordinate system (x, y, z) with a surface vertex being its origin. As aspherical surface data, aspherical coefficients and the like are shown. In the aspherical surface data on the examples, the coefficient of a term without its description is 0; in all the data, $E-n=\times 10^{-n}$.

$$z=(c \cdot h^2)/[1+\sqrt{1-(1+K) \cdot c^2 \cdot h^2}]+\Sigma(Aj \cdot h^j) \quad (AS)$$

where h is a height in a direction perpendicular to the z axis (the optical axis AX) ($h^2=x^2+y^2$), z is the amount of sag in the direction of the optical axis AX in the position of the height h (with respect to the surface vertex), c is a curvature at the surface vertex (the reciprocal of the radius of curvature r), K is a conic constant and Aj is the aspherical coefficient of the j-th order.

As various types of data, the focal length of the entire system (f, mm), F number (FNO), the entire angle of view (2ω, °) and image height (Y', mm) are shown; furthermore, the magnification of the entire system (β), variable spacing data (di: on-axis surface spacing changed by focusing, i: surface number, d0: subject distance), the entire lens length (TL, mm), back focus (BF, mm) and effective F number (effective FNO) are shown in each focus position (a state where the subject is at infinity, a state where β=−0.025 time, a state where the subject is the closest); as lens group data, the focal length (f1, f2, f3; mm) of each lens group is shown. Here, the back focus BF used is a distance from the surface of the parallel flat surface plate PT on the side of the image to the image surface IM, and the entire lens length TL is a distance from the lens foreground surface to the image surface IM. In table 1, related data on the conditional formulas are shown in the examples; in table 2, corresponding values on the conditional formulas are shown in the examples.

FIGS. 6A to 6I to 10A to 10I are diagrams of aberrations corresponding to Examples 1 to 5 (EXs 1 to 5), and show aberrations in individual focus positions. Specifically, FIGS. 6A to 10A, FIGS. 6D to 10D and FIGS. 6G to 10G show spherical aberrations and the like, FIGS. 6B to 10B, FIGS. 6E to 10E and FIGS. 6H to 10H show astigmatism and FIGS. 6C to 10C, FIGS. 6F to 10F and FIGS. 6I to 10I show distortions; FIGS. 6A to 10A, FIGS. 6B to 10B and FIGS. 6C to 10C show aberrations at the state where the subject is at infinity, FIGS. 6D to 10D, FIGS. 6E to 10E and FIGS. 6F to 10F show aberrations at the state where β=−0.025 time and FIGS. 6G to 10G, FIGS. 6H to 10H and FIGS. 6I to 10I show aberrations at the state where the subject is the closest.

In FIGS. 6A to 6I to 10A to 10I, FNO is F number, and Y' (mm) is the maximum image height (corresponding to the distance from the optical axis AX and corresponding to half of the diagonal length of the light receiving surface SS) on the light receiving surface SS of the image sensing element SR. In the diagram of the spherical aberration, a solid line d, an alternate long and short dash line g and an alternate long and two short dashes line c respectively represent spherical aberrations (mm) for d line, g line and c line, and a broken line SC represents an unsatisfactory amount of sine condition (mm). In the diagram of the astigmatism, a broken line DM represents a meridional image surface, a solid line DS is a sagittal image surface and they represent their astigmatism (mm) for d line. In the diagram of the distortion, a solid line represents distortion (%) for d line.

Example 1

| | Unit: mm Surface data | | | |
|---|---|---|---|---|
| Surface number | r | d | nd | vd |
| Object surface | ∞ | d0 | | |
| 1 | 15.846 | 1.500 | 1.48749 | 70.45 |
| 2 | 10.374 | 10.169 | | |

-continued

| | | | | |
|---|---|---|---|---|
| 3 | −13.584 | 6.420 | 1.91082 | 35.25 |
| 4 | −18.037 | 0.200 | | |
| 5 | 33.781 | 4.667 | 1.77250 | 49.65 |
| 6 | −20.395 | 0.800 | 1.84666 | 23.78 |
| 7 | −44.804 | 0.800 | | |
| 8 (Aperture stop) | ∞ | Variable | | |
| 9 | −111.572 | 0.800 | 1.49700 | 81.61 |
| 10 | 19.908 | Variable | | |
| 11* | 17.511 | 5.608 | 1.58313 | 59.38 |
| 12* | −22.234 | 0.200 | | |
| 13 | 219.229 | 0.800 | 1.60342 | 38.00 |
| 14 | 10.314 | 4.362 | 1.49700 | 81.61 |
| 15 | 24.004 | 17.041 | | |
| 16 | ∞ | 3.000 | 1.51680 | 64.20 |
| 17 | ∞ | BF | | |
| Image surface | ∞ | | | |

Aspherical data

11th surface

K = 0.00000
A4 = −2.66952E−05
A6 = 4.68752E−08

12th surface

K = 0.00000
A4 = 4.54598E−05
A6 = −1.74512E−09
A8 = 3.07624E−10

Various types of data

| | | | |
|---|---|---|---|
| f | 23.000 | | |
| FNO | 2.030 | | |
| 2ω | 31.691 | | |
| Y' | 14.200 | | |
| β | At infinity | −0.025 | −0.101 |
| d0 | ∞ | −926.712 | −234.000 |
| d8 | 2.804 | 3.661 | 6.269 |
| d10 | 5.830 | 4.972 | 2.364 |
| TL | 66.000 | 66.000 | 66.000 |
| BF | 1.000 | 1.000 | 1.000 |
| Effective FNO | | 2.077 | 2.208 |

Lens group data

| Group | Initial surface | Focal length |
|---|---|---|
| 1 | 1 | 28.092 |
| 2 | 9 | −33.922 |
| 3 | 11 | 27.969 |

Example 2

Unit: mm
Surface data

| Surface number | r | d | nd | vd |
|---|---|---|---|---|
| Object surface | ∞ | d0 | | |
| 1 | 18.596 | 1.500 | 1.48749 | 70.45 |
| 2 | 10.150 | 10.010 | | |
| 3 | −12.751 | 4.433 | 1.83481 | 42.72 |
| 4 | −16.744 | 0.200 | | |
| 5 | 40.069 | 1.200 | 1.84666 | 23.78 |
| 6 | 17.945 | 4.813 | 1.80420 | 46.49 |
| 7 | −32.648 | 0.800 | | |
| 8 (Aperture stop) | ∞ | Variable | | |
| 9 | −61.346 | 0.800 | 1.49700 | 81.61 |
| 10 | 21.542 | Variable | | |
| 11* | 17.871 | 5.619 | 1.58313 | 59.38 |
| 12* | −23.948 | 0.200 | | |
| 13 | 28.992 | 0.800 | 1.75520 | 27.52 |
| 14 | 12.380 | 2.389 | 1.49700 | 81.61 |
| 15 | 16.954 | 20.038 | | |
| 16 | ∞ | 3.000 | 1.51680 | 64.20 |
| 17 | ∞ | BF | | |
| Image surface | ∞ | | | |

Aspherical data

11th surface

K = 0.00000
A4 = −3.46388E−05
A6 = 2.55063E−09

12th surface

K = 0.00000
A4 = 3.20873E−05
A6 = −3.04654E−08
A8 = 3.07720E−10

Various types of data

| | | | |
|---|---|---|---|
| f | 23.000 | | |
| FNO | 2.030 | | |
| 2ω | 31.691 | | |
| Y' | 14.200 | | |
| β | At infinity | −0.025 | −0.103 |
| d0 | ∞ | −931.633 | −234.000 |
| d8 | 3.085 | 4.018 | 6.890 |
| d10 | 6.113 | 5.180 | 2.308 |
| TL | 66.000 | 66.000 | 66.000 |
| BF | 1.000 | 1.000 | 1.000 |
| Effective FNO | | 2.085 | 2.250 |

Lens group data

| Group | Initial surface | Focal length |
|---|---|---|
| 1 | 1 | 29.011 |
| 2 | 9 | −31.976 |
| 3 | 11 | 26.572 |

Example 3

Unit: mm
Surface data

| Surface number | r | d | nd | vd |
|---|---|---|---|---|
| Object surface | ∞ | d0 | | |
| 1 | 17.320 | 1.500 | 1.48749 | 70.45 |
| 2 | 10.412 | 10.088 | | |
| 3 | −13.114 | 5.869 | 1.83481 | 42.72 |
| 4 | −16.747 | 0.200 | | |
| 5 | 30.498 | 4.839 | 1.80420 | 46.49 |
| 6 | −20.871 | 0.800 | 1.84666 | 23.78 |
| 7 | −49.280 | 0.800 | | |
| 8 (Aperture stop) | ∞ | Variable | | |
| 9 | −66.253 | 0.800 | 1.69680 | 55.48 |
| 10 | 21.950 | Variable | | |

-continued

| | | | | |
|---|---|---|---|---|
| 11* | 17.603 | 5.412 | 1.58313 | 59.38 |
| 12* | −21.633 | 0.200 | | |
| 13 | 33.186 | 0.800 | 1.64769 | 33.84 |
| 14 | 10.836 | 3.449 | 1.49700 | 81.61 |
| 15 | 18.319 | 19.017 | | |
| 16 | ∞ | 3.000 | 1.51680 | 64.20 |
| 17 | ∞ | BF | | |
| Image surface | ∞ | | | |

Aspherical data

11th surface

K = 0.00000
A4 = −4.10110E−05
A6 = 2.70047E−08

12th surface

K = 0.00000
A4 = 3.20724E−05
A6 = 1.97597E−09
A8 = 3.58643E−10

Various types of data

| | | | |
|---|---|---|---|
| f | 23.000 | | |
| FNO | 2.030 | | |
| 2ω | 31.691 | | |
| Y' | 14.200 | | |
| β | At infinity | −0.025 | −0.104 |
| d0 | ∞ | −932.490 | −234.000 |
| d8 | 3.001 | 3.731 | 5.943 |
| d10 | 5.225 | 4.495 | 2.283 |
| TL | 66.000 | 66.000 | 66.000 |
| BF | 1.000 | 1.000 | 1.000 |
| Effective FNO | | 2.091 | 2.262 |

Lens group data

| Group | Initial surface | Focal length |
|---|---|---|
| 1 | 1 | 24.952 |
| 2 | 9 | −23.574 |
| 3 | 11 | 22.950 |

Example 4

Unit: mm
Surface data

| Surface number | r | d | nd | vd |
|---|---|---|---|---|
| Object surface | ∞ | d0 | | |
| 1 | 15.647 | 1.500 | 1.48749 | 70.45 |
| 2 | 10.469 | 11.337 | | |
| 3 | −12.550 | 6.387 | 1.91082 | 35.25 |
| 4 | −16.225 | 0.200 | | |
| 5 | 35.186 | 4.759 | 1.80420 | 46.49 |
| 6 | −19.830 | 0.800 | 1.84666 | 23.78 |
| 7 | −61.072 | 0.800 | | |
| 8 | ∞ | Variable | | |
| (Aperture stop) | | | | |
| 9 | 203.712 | 0.800 | 1.49700 | 81.61 |
| 10 | 19.626 | Variable | | |
| 11* | 15.946 | 6.031 | 1.58313 | 59.38 |
| 12* | −22.815 | 0.200 | | |
| 13 | −643.993 | 0.800 | 1.70154 | 41.15 |
| 14 | 10.616 | 4.146 | 1.49700 | 81.61 |
| 15 | 29.573 | 15.833 | | |
| 16 | ∞ | 3.000 | 1.51680 | 64.20 |
| 17 | ∞ | BF | | |
| Image surface | ∞ | | | |

Aspherical data

11th surface

K = 0.00000
A4 = −2.40340E−05
A6 = 3.30155E−08

12th surface

K = 0.00000
A4 = 5.59929E−05
A6 = −3.22955E−08
A8 = 4.40878E−10

Various types of data

| | | | |
|---|---|---|---|
| f | 23.000 | | |
| FNO | 2.030 | | |
| 2ω | 31.691 | | |
| Y' | 14.200 | | |
| β | At infinity | −0.025 | −0.099 |
| d0 | ∞ | −921.989 | −234.000 |
| d8 | 2.500 | 3.423 | 6.201 |
| d10 | 5.908 | 4.985 | 2.207 |
| TL | 66.000 | 66.000 | 66.000 |
| BF | 1.000 | 1.000 | 1.000 |
| Effective FNO | | 2.066 | 2.166 |

Lens group data

| Group | Initial surface | Focal length |
|---|---|---|
| 1 | 1 | 28.614 |
| 2 | 9 | −43.762 |
| 3 | 11 | 33.397 |

Example 5

Unit: mm
Surface data

| Surface number | r | d | nd | vd |
|---|---|---|---|---|
| Object surface | ∞ | d0 | | |
| 1 | 19.239 | 1.500 | 1.48749 | 70.45 |
| 2 | 10.408 | 9.874 | | |
| 3 | −12.658 | 5.279 | 1.83481 | 42.72 |
| 4 | −15.861 | 0.200 | | |
| 5 | 32.372 | 0.800 | 1.84666 | 23.78 |
| 6 | 17.568 | 4.615 | 1.83481 | 42.72 |
| 7 | −61.400 | 0.800 | | |
| 8 | ∞ | Variable | | |
| (Aperture stop) | | | | |
| 9 | −291.851 | 0.800 | 1.74330 | 49.23 |
| 10 | 14.173 | 3.043 | 1.49700 | 81.61 |
| 11* | 95.544 | Variable | | |
| 12* | 23.372 | 4.586 | 1.58313 | 59.38 |
| 13* | −20.098 | 0.200 | | |
| 14 | 79.060 | 0.800 | 1.69895 | 30.05 |
| 15 | 12.877 | 2.229 | 1.91082 | 35.25 |
| 16 | 17.245 | 19.578 | | |
| 17 | ∞ | 3.000 | 1.51680 | 64.20 |
| 18 | ∞ | BF | | |
| Image surface | ∞ | | | |

-continued

Aspherical data

12th surface

K = 0.00000
A4 = −2.44408E−05
A6 = −3.33996E−08

13th surface

K = 0.00000
A4 = 4.37817E−05
A6 = −1.40417E−07
A8 = 3.65864E−10

Various types of data

| f | 23.000 | | |
|---|---|---|---|
| FNO | 2.030 | | |
| 2ω | 31.691 | | |
| Y' | 14.200 | | |
| β | At infinity | −0.025 | −0.101 |
| d0 | ∞ | −925.301 | −234.000 |
| d8 | 2.623 | 3.506 | 6.196 |
| d11 | 5.073 | 4.190 | 1.500 |
| TL | 66.000 | 66.000 | 66.000 |
| BF | 1.000 | 1.000 | 1.000 |
| Effective FNO | | 2.073 | 2.190 |

Lens group data

| Group | Initial surface | Focal length |
|---|---|---|
| 1 | 1 | 28.344 |
| 2 | 9 | −39.426 |
| 3 | 12 | 31.016 |

TABLE 1

| Related data | Example 1 | Example 2 | Example 3 | Example 4 | Example 5 |
|---|---|---|---|---|---|
| f | 23.000 | 23.000 | 23.000 | 23.000 | 23.000 |
| f1 | 28.092 | 29.011 | 24.952 | 28.614 | 28.344 |
| f2 | −33.922 | −31.976 | −23.574 | −43.762 | −39.426 |
| f3 | 27.969 | 26.572 | 22.950 | 33.397 | 31.016 |
| BH1 | 10.735 | 12.195 | 9.500 | 11.265 | 11.697 |
| BH3 | −8.523 | −6.817 | −6.989 | −9.816 | −6.138 |
| T1 | 23.756 | 22.156 | 23.295 | 24.982 | 22.267 |
| T3 | 10.971 | 9.008 | 9.862 | 11.177 | 7.815 |
| β2 | −39.965 | −6.460 | −3.506 | 5.628 | 10.842 |
| β3 | −0.020 | −0.123 | −0.263 | 0.143 | 0.075 |
| r1 | −111.572 | −61.346 | −66.253 | 203.712 | — |
| r2 | 19.908 | 21.542 | 21.950 | 19.626 | — |
| νp | — | — | — | — | 81.61 |
| νn | — | — | — | — | 49.23 |

TABLE 2

| Conditional formula corresponding values | | Example 1 | Example 2 | Example 3 | Example 4 | Example 5 |
|---|---|---|---|---|---|---|
| (1) | BH1/T1 | 0.452 | 0.550 | 0.408 | 0.451 | 0.525 |
| (2) | f3/f | 1.216 | 1.155 | 0.998 | 1.452 | 1.349 |
| (3) | f2/f | −1.475 | −1.390 | −1.025 | −1.903 | −1.714 |
| (4) | f1/f | 1.221 | 1.261 | 1.085 | 1.244 | 1.232 |
| (5) | BH3/T3 | −0.777 | −0.757 | −0.709 | −0.878 | −0.785 |
| (6) | $|β2|$ | 39.965 | 6.460 | 3.506 | 5.628 | 10.842 |
| (7) | $(1-β2^2)β3^2$ | −0.638 | −0.616 | −0.781 | −0.627 | −0.656 |
| (8) | $(r1+r2)/(r1-r2)$ | 0.697 | 0.480 | 0.502 | 1.213 | — |
| (9) | νp − νn | — | — | — | — | 32.38 |

What is claimed is:

1. A wide-angle lens system which is formed, sequentially from a side of an object, with a first group having a positive optical power, a second group having a negative optical power and a third group having a positive optical power and in which at a time of focusing, only the second group is moved on an optical axis, wherein the wide-angle lens system satisfies conditional formulas (1) and (2) below:

$$0.3 < BH1/T1 < 0.7 \quad (1)$$

$$0.9 < f3/f < 1.8 \quad (2)$$

where BH1 is a distance from a final surface of the first group to a principal point position on a back side of the first group (a direction extending from the side of the object to an image surface is positive), T1 is a distance on the optical axis from a lens element surface of the first group closest to the side of the object to a lens element surface closest to the side of the image, f3 is a focal length of the third group and f is a focal length of the entire system.

2. The wide-angle lens system of claim 1 satisfies conditional formula (3) below:

$$-2.4 < f2/f < -0.5 \quad (3)$$

where f2 is a focal length of the second group and
f is the focal length of the entire system.

3. The wide-angle lens system of claim 1 satisfies conditional formula (4) below:

$$0.7 < f1/f < 1.6 \quad (4)$$

where f1 is a focal length of the first group and
f is the focal length of the entire system.

4. The wide-angle lens system of claim 1 satisfies conditional formula (5) below:

$$-1.0 < BH3/T3 < -0.5 \quad (5)$$

where BH3 is a distance from a final surface of the third group to a principal point position on a back side of the third group (the direction extending from the side of the object to the image surface is positive), and T3 is a distance on the optical axis from a lens element surface of the third group closest to the side of the object to the lens element surface closest to the side of the image.

5. The wide-angle lens system of claim 1 satisfies conditional formula (6) below:

$$2 < |β2| \quad (6)$$

where β2 is a paraxial lateral magnification of the second group at a time of focusing at infinity.

6. The wide-angle lens system of claim 1 satisfies conditional formula (7) below:

$$(1-β2^2)β3^2 < -0.5 \quad (7)$$

where β2 is a paraxial lateral magnification of the second group at a time of focusing at infinity, and β3 is a paraxial lateral magnification of the third group at the time of focusing at infinity.

7. The wide-angle lens system of claim 1, wherein an aperture stop is arranged in an air spacing between the first group and the second group.

8. The wide-angle lens system of claim 7 in which the second group is formed with one negative lens element and which satisfies conditional formula (8) below:

$$0.2 < (r1+r2)/(r1-r2) < 1.5 \quad (8)$$

where r1 is a radius of curvature of a surface of the negative lens element on the side of the object, and r2 is a radius of curvature of a surface of the negative lens element on the side of the image.

9. The wide-angle lens system of claim 1 in which the second group is formed with one cemented lens element composed of a negative lens element and a positive lens element and which satisfies conditional formula (9) below:

$$\nu p - \nu n > 20 \qquad (9)$$

where νp is an Abbe number of the positive lens element of the cemented lens element, and νn is an Abbe number of the negative lens element of the cemented lens element.

10. The wide-angle lens system of claim 7, wherein, in the third group, a biconvex positive lens element is arranged which has an aspherical surface whose positive optical power is reduced as the aspherical surface extends to a periphery portion.

11. The wide-angle lens system of claim 2 satisfies conditional formula (4) below:

$$0.7 < f1/f < 1.6 \qquad (4)$$

where f1 is a focal length of the first group and
f is the focal length of the entire system.

12. The wide-angle lens system of claim 2 satisfies conditional formula (5) below:

$$-1.0 < BH3/T3 < -0.5 \qquad (5)$$

where BH3 is a distance from a final surface of the third group to a principal point position on a back side of the third group (the direction extending from the side of the object to the image surface is positive), and T3 is a distance on the optical axis from a lens element surface of the third group closest to the side of the object to the lens element surface closest to the side of the image.

13. The wide-angle lens system of claim 2 satisfies conditional formula (6) below:

$$2 < |\beta 2| \qquad (6)$$

where β2 is a paraxial lateral magnification of the second group at a time of focusing at infinity.

14. The wide-angle lens system of claim 2 satisfies conditional formula (7) below:

$$(1-\beta 2^2)\beta 3^2 < -0.5 \qquad (7)$$

where β2 is a paraxial lateral magnification of the second group at a time of focusing at infinity, and β3 is a paraxial lateral magnification of the third group at the time of focusing at infinity.

15. The wide-angle lens system of claim 2, wherein an aperture stop is arranged in an air spacing between the first group and the second group.

16. The wide-angle lens system of claim 15 in which the second group is formed with one negative lens element and which satisfies conditional formula (8) below:

$$0.2 < (r1+r2)/(r1-r2) < 1.5 \qquad (8)$$

where r1 is a radius of curvature of a surface of the negative lens element on the side of the object, and r2 is a radius of curvature of a surface of the negative lens element on the side of the image.

17. The wide-angle lens system of claim 2 in which the second group is formed with one cemented lens element composed of a negative lens element and a positive lens element and which satisfies conditional formula (9) below:

$$\nu p - \nu n > 20 \qquad (9)$$

where νp is an Abbe number of the positive lens element of the cemented lens element, and νn is an Abbe number of the negative lens element of the cemented lens element.

18. The wide-angle lens system of claim 15, wherein, in the third group, a biconvex positive lens element is arranged which has an aspherical surface whose positive optical power is reduced as the aspherical surface extends to a periphery portion.

19. An image sensing optical device comprising:

the wide-angle lens system of claim 1; and an image sensing element that converts an optical image formed on a light receiving surface into an electrical signal, wherein the wide-angle lens system is provided such that the optical image of a subject is formed on the light receiving surface of the image sensing element.

20. A digital apparatus, wherein the digital apparatus includes the image sensing optical device of claim 19 such that at least one function of still image shooting and moving image shooting of the subject is added.

* * * * *